June 18, 1963 V. G. MAY 3,094,347
LATCH STRUCTURE
Filed Oct. 16, 1961
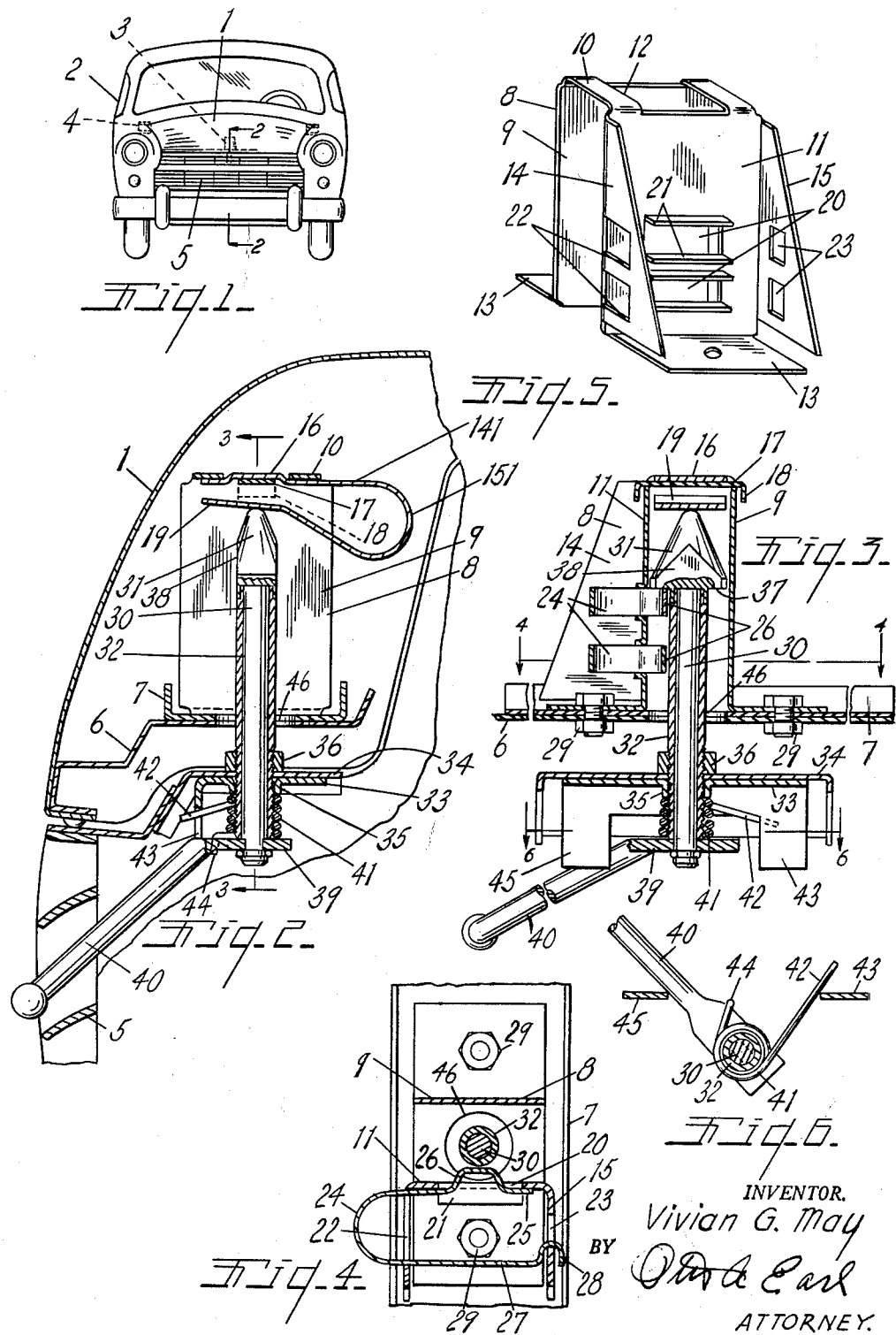
INVENTOR.
Vivian G. May
BY
ATTORNEY.

United States Patent Office 3,094,347
Patented June 18, 1963

3,094,347
LATCH STRUCTURE
Vivian G. May, Kalamazoo, Mich., assignor to Checker Motors Corporation, Kalamazoo, Mich.
Filed Oct. 16, 1961, Ser. No. 145,068
14 Claims. (Cl. 292—228)

This invention relates to improvements in latch structure. The principal objects of this invention are:

First, to provide a latch structure particularly adapted for recessed doors and closures such as automotive hoods in which an axially fixed latch bolt projects into the recess of the closure and is released by rotation of the latch bolt so that there are no projecting parts exposed on the closure to catch or injure persons coming in contact therewith.

Second, to provide a latch particularly adapted for automotive hoods which provides primary and secondary keepers, the second of which engages automatically as a safety catch but both of which are easily disengaged by a single releasing motion.

Third, to provide a latch structure in which an economical sheet metal housing effectively supports a latch opening spring and one or more keeper springs for coaction with a latch bolt mounted on a cooperating part of the latch assembly.

Fourth, to provide latch structure in which an axially fixed and rotatably mounted latch bolt is provided with a keeper engaging shoulder on one side engageable with the edge of a keeper spring and a flat side which may be rotated into opposed relation to the spring to disengage the latch.

Fifth, to provide a latch housing with a novel arrangement of slots and openings for securing retaining leaf spring keepers by a novel interlocking engagement with the separate fasteners thus reducing the cost of manufacture and assembly of the latch.

Other objects and advantages of the invention will be apparent from a consideration of the following description and claims. The drawings, of which there is one sheet, illustrate a highly practical form of the latch of the invention.

FIG. 1 is a front elevational view of an automobile illustrating the position of the latch of the invention thereon.

FIG. 2 is a fragmentary enlarged vertical longitudinal cross sectional view through the latch taken along the plane of the line 2—2 in FIG. 1.

FIG. 3 is a fragmentary transverse vertical cross sectional view taken along the plane of the line 3—3 in FIG. 2, and looking toward the front of the latch and the automobile.

FIG. 4 is a fragmentary horizontal cross sectional view taken along the plane of the line 4—4 in FIG. 3.

FIG. 5 is a perspective view of the keeper housing stamping of the latch structure.

FIG. 6 is a fragmentary horizontal cross sectional view taken along the plane of the line 6—6 in FIG. 3 and showing the latch release lever spring and stop of the latch structure.

The latch structure of the invention is disclosed as applied to the hood 1 of an automobile 2 but may be employed with other swinging closures. The latch structure is generally indicated at 3 in FIG. 1 and hinges 4 for swingably supporting the hood as is common are also generally indicated. 5 indicates the front grill of the automobile which may be varied in appearance and construction as is also common.

Turning to the particular structure of the latch as disclosed in FIGS. 2 to 6, the hood 1 is downwardly concave across the front of the vehicle and is provided with a transverse stiffening plate and latch mount as is common in automobile vehicles. The plate 6 may vary in size and shape with different styles and makes of automobiles. The plate 6 serves as a support first for a channel shaped reinforcing plate 7 which distributes the load applied to the latch and a keeper housing 8 formed as a sheet metal stamping of downwardly facing channel shaped cross section with a first side wall 9, top web 10 and opposed side wall 11. The web 10 is transversely slotted or cut away as at 12. Mounting flanges 13 are turned transversely outwardly from the side walls 9 and 11 and generally triangular spring supporting flanges 14 and 15 are turned laterally from the edges of the side wall 11.

The upper arm 141 of a U-shaped hood opening spring 151 is abutted against the underside of the top web 10 of the housing with an upward off-set 16 positioned in the slot 12. A spring retaining key bar 17 is passed underneath the off-set 16 and retained on the upper edges of the side walls by downturned ends 18 on the key bar. The lower arm 19 of the hood opening spring projects yieldably downwardly between the side walls 9 and 11 to coact with a latch pin as will be described.

The side wall 11 of the keeper housing defines a pair of vertically spaced transverse slots or openings 20 with outwardly turned flanges 21 on their upper and lower edges. The triangular side flange 14 is horizontally slotted as at 22 in the same general horizontal planes as the openings 20 and the side flange 15 defines a pair of openings 23 horizontally aligned with the openings 20 and the slots 22. A pair of generally U-shaped keeper springs 24 have inner arms 25 supported between the flanges 21 with inwardly off-set U-shaped folds 26 thereon forming keepers which project through the openings 20 into the keeper housing 8. The U-shaped bights of the keeper springs are supported in the slots 22 and the outer arms 27 of the springs are provided with U-bends or hooks 28 passed through the openings 23 and engaged with the edges of the openings to place the keeper springs under compressive stress. The keeper housing 8 with the hood opening spring 151 and keeper springs 24 is secured on the upper side of the reinforcing channel 7 by means of bolts 29.

Cooperating with the keeper housing 8, and keeper springs 24, is a latch pin 30 having a tapered head 31. The latch pin 30 is rotatably mounted in a latch pin mounting tube 32 having a threaded lower end received in a reinforcing plate 33 secured to the underside of a cross member 34 at the upper side of the grill 5. The reinforcing plate 33 has a downwardly extruded internally threaded neck 35 engageable with the threads on the tube and a lock nut 36 secures the tube in place and permits its adjustment to compensate for manufacturing variations in the positions of the hood 1 and the keeper housing 8.

The head 31 projects laterally beyond the sides of the tube 32 in keeper engaging shoulders 37 and has two flat sides 38 of reduced radial width which are generally flush with the sides of the tube 32. At its lower end below the tube 32 the pin 30 is provided with a non-circular driving connection with the flatted end 39 of an operating arm 40. A coil spring 41 sleeved around the lower end of the tube has one end 42 bearing against a depending flange 43 on the mounting plate 33 while its other end 44 bears against the operating arm 40 to bias the arm into locating engagement with a second flange 45 on the plate 33.

With the structure as described it will be apparent that closing motion of the hood downwardly against the cross member 34 at the top of the grill will cause the tapered head 31 of the latch pin to pass upwardly into the keeper housing with the tapered sides of the head pressing cammingly against the springs 24 and succesively forcing the keeper folds 26 outwardly as the latch pin head passes thereby. The keeper springs 24 and their keeper portions 26 spring back behind the keeper engaging shoulders 37 as the head passes and the latch and hood opening spring 19 is compressed by the end of the pin. Should the upper latch spring 24 break or be accidentally disengaged there is a second latch spring therebelow to engage the keeper shoulder 37 and prevent the hood from flying open while the vehicle is in motion. The coil spring 41 holds the latch pin and head in rotated position to engage the keepers 26. When it is desired to release the latch and open the hood the operating arm 40 is simply swung about 90° thus rotating one of the flat sides 38 on the latch pin head into registering relation with the keeper projections 26 so that the latch is disengaged at which time the spring 19, 151 forces the hood away from the grill 5. The mounting plate 6 and reinforcing plate 7 which support the keeper housing 8 must of course pass the head 31 of the latch bolt 30 and a hole 36 (see FIG. 4) is provided in the plates for this purpose.

What is claimed as new is:

1. A hood latch comprising,
 a keeper housing of downwardly opening channel shape having a top web and side walls,
 a transverse slot formed in said web to said side walls,
 a U-shaped hood opening spring having one arm lapped against the underside of said web with an upward off-set projecting into said slot and with another arm projecting yieldably between said side walls,
 a key bar supported by the side walls at the ends of said slot and under the off-set in said spring to retain said spring in place,
 attaching flanges on the lower edges of said side walls for attaching said housing to a support spaced below the top of a hood at the swinging end of the hood,
 side flanges turned laterally outwardly away from said housing from the edges of one of said side walls,
 one of said side flanges having vertically spaced slots formed therein and extending to the side wall,
 the other of said side flanges having vertically spaced openings formed therein with retaining edges at their outer ends opposed to said slots in said first side flange,
 vertically spaced slots formed in said side wall with outwardly projecting flanges on their upper and lower edges,
 vertically spaced U-shaped keeper springs having their bights supported in said slots in said first side flange with one arm of each spring extending across one of said slots in said side wall and retained between the flanges on the edges thereof,
 the other arms of said keeper springs having hooks on their ends engaging the edges of the openings in said other side flange to compress the keeper springs against said one side wall,
 keeper folds formed in the first arms of said keeper springs and projecting through said slots in said side wall,
 a latch spring support plate attachable to the body of a vehicle below said housing,
 a latch pin tube threadedly and adjustably mounted in said support plate to project into said housing when the hood is closed,
 a latch pin rotatably mounted in said tube and having an upwardly tapering head with a downwardly facing keeper engaging shoulder projecting beyond the side of said tube to engage said keeper folds on said keeper springs,
 flat sides of reduced radius formed on said head and rotatable into clearing relation to said keeper springs,
 an operating arm secured to the lower end of said latch pin to project toward the grille of a vehicle,
 and a torsion spring sleeved around the lower end of said tube and having ends bearing against said arm and said support plate to bias said pin and head to keeper engaging position,
 said latch pin support plate having a projection thereon in the path of said operating arm in the keeper engaging position of said head.

2. A hood latch comprising,
 a keeper housing of downwardly opening channel shape having a top web and side walls,
 a transverse slot formed in said web,
 a U-shaped hood opening spring having one arm lapped against the underside of said web with another arm projecting yieldably between said side walls,
 a key bar supported by the side walls at the ends of said slot and under said spring to retain said spring in place,
 attaching flanges on the lower edges of said side walls for attaching said housing to a support spaced below the top of a hood at the swinging end of the hood,
 side flanges turned laterally outwardly away from said housing from the edges of one of said side walls,
 one of said side flanges having vertically spaced slots formed therein,
 the other of said side flanges having vertically spaced openings formed therein with retaining edges at their outer ends opposed to said slots in said first side flange,
 vertically spaced slots formed in said side wall with outwardly projecting flanges on their upper and lower edges,
 vertically spaced U-shaped keeper springs having their bights supported in said slots in said first side flange with one arm of each spring extending across one of said slots in said side wall and retained between the flanges on the edges thereof,
 the other arms of said keeper springs having hooks on their ends engaging the edges of the openings in said other side flange to compress the keeper springs against said one side wall,
 keeper folds formed in the first arms of said keeper springs and projecting through said slots in said side wall,
 a latch pin support attachable to the body of a vehicle below said housing,
 a latch pin the tube threadedly and adjustably mounted in said support to project into said housing when the hood is closed,
 a latch pin rotatably mounted in said tube and having an upwardly tapering head with a downwardly facing keeper engaging shoulder projecting beyond the side of said tube to engage said keeper folds on said keeper springs,
 flat sides of reduced radius formed on said head and rotatable into clearing relation to said keeper springs,
 an operating arm secured to the lower end of said latch pin to project toward the grille of a vehicle,
 and a torsion spring sleeved around the lower end of said tube and having ends bearing against said arm and said support plate to bias said pin and head to keeper engaging position, said latch pin support plate having a projection thereon in the path of said operating arm in the keeper engaging position of said head.

3. A hood latch comprising, a keeper housing of downwardly opening channel shape having a top web and side walls, a U-shaped hood opening spring having one arm retained against the underside of said web with another arm projecting yieldably between said side walls, means on the lower edges of said side walls for attaching said housing to a support spaced below the top of a hood at the swinging end of the hood, side flanges turned laterally outwardly away from said housing from the edges of one of said side walls, one of said side flanges having vertically spaced slots formed therein, the other of said side flanges having vertically spaced openings formed therein with retaining edges at their outer ends opposite said slots in said first side flange, vertically spaced slots formed in said side wall with outwardly projecting flanges on their upper and lower edges, vertically spaced U-shaped keeper springs having their bights supported in said slots in said first side flange with one arm of each spring extending across one of said slots in said side wall and retained between the flanges on the edges thereof, the other arms of said keeper springs having hooks on their ends engaging the edges of the openings in said other side flange to compress the keeper springs against said one side wall, keeper folds formed in the first arms of said keeper springs and projecting through said slots in said side wall, a latch pin support attachable to the body of a vehicle below said housing, a latch pin tube threadedly and adjustably mounted in said support to project toward said housing when the hood is closed, a latch pin rotatably mounted in said tube and having an upwardly tapering head with a downwardly facing keeper engaging shoulder projecting beyond the side of said pin to engage said keeper folds on said keeper springs, flat sides of reduced radius formed on said head and rotatable into clearing relation to said keeper springs, an operating arm secured to the lower end of said latch pin to project toward the grille of a vehicle, a torsion spring sleeved around the lower end of said tube and having ends bearing against said arm and said support to bias said pin and head to keeper engaging position, and means on said latch pin support forming a projection in the path of said operating arm in the keeper engaging position of said head.

4. A hood latch comprising, a keeper housing of downwardly opening channel shape having a top web and side walls, a U-shaped hood opening spring having one arm retained against said web with another arm projecting yieldably between said side walls, means for attaching said housing to a support spaced below the top of a hood at the swinging end of the hood, side flanges turned laterally outwardly away from said housing from the edges of one of said side walls, one of said side flanges having vertically spaced slots formed therein, the other of said side flanges having vertically spaced openings formed therein with retaining edges at their outer ends opposite said slots in said first side flange, vertically spaced slots formed in said side wall, vertically spaced U-shaped keeper springs having their bights supported in said slots in said first side flange with one arm of each spring extending across one of said slots in said side wall, the other arms of said keeper springs having hooks on their ends engaging the edges of the openings in said other side flange to compress the keeper springs against said one side wall, keeper folds formed in the first arms of said keeper springs and projecting through said slots in said side wall, a latch pin support attachable to the body of a vehicle below said housing, a latch pin tube threadedly and adjustably mounted in said support to project toward said housing when the hood is closed, a latch pin rotatably mounted in said tube and having an upwardly tapering head with a downwardly facing keeper engaging shoulder projecting beyond the side of said pin to engage said keeper folds on said keeper springs, flat sides of reduced radius formed on said head and rotatable into clearing relation to said keeper springs, an operating arm secured to the lower end of said latch pin to project toward the grille of a vehicle, a torsion spring sleeved around the lower end of said tube and having ends bearing against said arm and said support to bias said pin and head to keeper engaging position, and means forming a projection in the path of said operating arm in the keeper engaging position of said head.

5. A hood latch comprising, a keeper housing having a downwardly facing top web and side wall, a U-shaped hood opening spring having one arm lapped against said top wall with another arm projecting yieldably alongside said side wall, means for attaching said housing to a support at the swinging end of the hood, side flanges turned laterally outwardly away from said housing from the edges of said side wall, one of said side flanges having vertically spaced slots formed therein, the other of said side flanges having vertically spaced openings formed therein with retaining edges at their outer ends opposed to said slots in said first side flange, vertically spaced slots formed in said side wall, with outwardly projecting flanges on their upper and lower edges, vertically spaced U-shaped keeper springs having their bights supported in said slots in said side flange with one arm of each spring extending across one of said slots in said side wall and retained between the flanges on the edges thereof, the other arms of said keeper springs having hooks on their ends engaging the edges of the openings in said side flange to compress the keeper springs against said side wall, keeper folds formed in the first arms of said keeper springs and projecting through said slots in said side wall, a latch pin support attachable to the body of a vehicle below said housing, a latch pin rotatably mounted on said support and having an upwardly tapering head with a downwardly facing keeper engaging shoulder projecting beyond the side of said pin to engage said keeper folds on said keeper springs, flat sides of reduced radius formed on said head and rotatable into clearing relation to said keeper springs, an operating arm secured to the lower end of said latch pin to project toward the grille of a vehicle, and a torsion spring means engaged with said pin to bias said pin and head to keeper engaging position, 6. A hood latch comprising, a keeper housing having a downwardly facing top web and a side wall, a U-shaped hood opening spring having one arm lapped against said top wall with another arm projecting yieldably alongside said side wall, means for attaching said housing to a support at the swinging end of the hood, a side flange turned laterally outwardly away from said housing from the edge of said side wall, said side flange having an opening formed therein with a retaining edge at its outer end, a slot formed in said side wall, with outwardly projecting flanges on its upper and lower edges, a U-shaped keeper spring having one arm extending across said slot in said side wall and retained between the flanges on the edges thereof, the other arm of said keeper spring having a hook on its end engaging the edge of the opening in said side flange to compress the keeper spring against said side wall, a keeper fold formed in the first arm of said keeper spring and projecting through said slot in said side wall, a latch pin support attachable to the body of a vehicle below said housing, a latch pin rotatably mounted on said support and having an upwardly tapering head with a downwardly facing keeper engaging shoulder projecting beyond the side of said pin to engage said keeper fold on said keeper spring, flat sides of reduced radius formed on said head and rotatable into clearing relation to said keeper spring, an operating arm secured to the lower end of said latch pin to project toward the grille of a vehicle, and a torsion spring means engaged with said pin to bias said pin and head to keeper engaging position.

7. A hood latch comprising, a keeper housing having a top wall and a side wall, a hood opening spring having one end abutted against said top wall and with its other end projecting yieldably therebelow, means attaching said housing to a hood at the swinging end of the hood, side flanges turned laterally outwardly away from said housing from the edges of said side wall, one of said side flanges having a slot formed therein and extending to the side wall, the other of said side flanges having an opening formed therein with a retaining edge at its outer end opposed to said slot in said first side flange, a slot formed in said side wall with outwardly projecting flanges on its upper and lower edges, a U-shaped keeper spring having its bight supported in said slot in said first side flange with one arm of the spring extending across said slot in said side wall and retained between the flanges on the edges thereof, the other arm of said keeper spring having a hook on its end engaging the edge of the opening in said other side flange to compress the keeper spring against said one side wall, a keeper fold formed in the first arm of said keeper spring and projecting through said slot in said side wall, a latch pin support plate attachable to the body of a vehicle below said housing, a latch pin rotatably mounted on said support and having an upwardly tapering head with a downwardly facing keeper engaging shoulder projecting beyond the side of said pin to engage said keeper fold on said keeper spring, a flat side of reduced radius formed on said head and rotatable into clearing relation to said keeper spring, an operating arm secured to said latch pin to project toward the grille of a vehicle, and torsion spring means connected to said pin to bias said pin and head to keeper engaging position.

8. A hood latch comprising, a keeper housing having a top wall and a side wall, a hood opening spring having one end abutted against said top wall and with its other end projecting yieldably therebelow, means attaching said housing to a hood at the swinging end of the hood, side flanges turned laterally outwardly away from said housing from the edges of said side wall, one of said side flanges having a slot formed therein, the other of said side flanges having an opening formed therein with a retaining edge at its outer end opposed to said slot in said first side flange, a slot formed in said side wall, a U-shaped keeper spring having its bight supported in said slot in said first side flange with one arm of the spring extending across said slot in said side wall, the other arm of said keeper spring having a hook on its end engaging the edge of the opening in said other side flange to compress the keeper spring against said one side wall, a keeper fold formed in the first arm of said keeper spring and projecting through said slot in said side wall, a latch pin support plate attachable to the body of a vehicle below said housing, a latch pin rotatably mounted on said support and having an upwardly tapering head with a downwardly facing keeper engaging shoulder projecting beyond the side of said pin to engage said keeper fold on said keeper spring, a flat side of reduced radius formed on said head and rotatable into clearing relation to said keeper spring, an operating arm secured to said latch pin to project toward the grille of a vehicle, and torsion spring means connected to said pin to bias said pin and head to keeper engaging position.

9. In an automotive vehicle having a body panel member and a chambered swingable closure member mounted to close against the panel, a latch structure comprising, a latch pin axially fixedly and rotatably mounted on said panel to project into said closure member in the closed position of the closure, an outwardly tapered head on said pin having a keeper engaging shoulder on one side at its inner end projecting beyond the side of the pin, said head and shoulder being cut away along a side of the pin angularly displaced from the shoulder, a support secured to said closure member with a first wall positioned in spaced side-by-side relation to said pin in the closed position of the closure member, a second wall on said support arranged at an angle to said first wall, openings formed in said walls with supporting flanges turned from opposite edges of the opening in the first wall and away from said pin, a leaf spring having one end abutted against said first wall and supported by said flanges with an integral off-set bow projecting through the opening in said one wall into the path of said head as the closure closes on said body member to engage behind said shoulder in the closed position of the closure, the other end of said spring being curved springably in a U-bend from said first end and having a hooked engagement with the edge of the opening in said second wall, an operating arm secured to said pin and projecting therefrom to rotate the pin, and torsion means rotatively biasing said pin to position said shoulder into overlapping engagement with said projecting off-set bow on said spring.

10. In an automotive vehicle having a body panel member and a chambered swingable closure member mounted to close against the panel, a latch structure comprising, a latch pin axially fixedly and rotatably mounted on said panel to project into said closure member in the closed position of the closure, an outwardly tapered head on said pin having a keeper engaging shoulder on one side at its inner end projecting beyond the side of the pin, said head and shoulder being cut away along a side of the pin angularly displaced from the shoulder, a support secured to said closure member with a first wall positioned in spaced side-by-side relation to said pin in the closed position of the closure member, a second wall on said support arranged at an angle to said first wall, openings formed in said walls, a leaf spring having one end abutted against said first wall with an integral off-set bow projecting through the opening in said one wall into the path of said head as the closure closes on said body member to engage behind said shoulder in the closed position of the closure, the other end of said spring being curved springably from said first end and having a hooked engagement with the edge of the opening in said second wall, an operating arm secured to said pin and projecting therefrom to rotate the pin, and torsion means rotatively biasing said pin to position said shoulder into overlapping engagement with said projecting off-set bow on said spring.

11. In an automotive vehicle having a body panel member and a chambered swingable closure member mounted to close against the panel, a latch structure comprising, a latch pin axially fixedly and rotatably mounted on said panel to project into said closure member in the closed position of the closure, a head on said pin having a keeper engaging shoulder on one side at its inner end projecting beyond the side of the pin, said head and shoulder being cut away along a side of the pin angularly displaced from the shoulder, a support secured to said closure member with a first wall positioned in spaced side-by-side relation to said pin in the closed position of the closure member, a second wall on said support arranged at an angle to said first wall, openings formed in said walls with supporting flanges turned from opposite edges of the opening in the first wall and away from said pin, a leaf spring having one end abutted against said first wall and supported by said flanges with an integral off-set bow projecting through the opening in said one wall into the path of said head as the closure closes on said body member to engage behind said shoulder in the closed position of the closure, the other end of said spring being curved springably in a U-bend from said first end and having a hooked engagement with the edge of the opening in said second wall, an operating arm secured to said pin and projecting therefrom to rotate the pin, and torsion means rotatively biasing said pin to position said shoulder into overlapping engagement with said projecting off-set bow on said spring.

12. In an automotive vehicle having a body panel member and a chambered swingable closure member mounted to close against the panel, a latch structure comprising, a latch pin axially fixedly and rotatably mounted on said panel to project into said closure member in the closed position of the closure, a head on said pin having a keeper engaging shoulder on one side at its inner end projecting beyond the side of the pin, said head and shoulder being cut away along a side of the pin angularly displaced from the shoulder, a support secured to said closure member with a first wall positioned in spaced side-by-side relation to said pin in the close position of the closure member, a second wall on said support arranged at an angle to said first wall, openings formed in said walls, a leaf spring having one end abutted against said first wall with a portion projecting through the opening in said one wall into the path of said head as the closure closes on said body member to engage behind said shoulder in the closed position of the closure, the other end of said spring being curved springably from said first end and having a hooked engagement with the edge of the opening in said second wall, an operating arm secured to said pin and projecting therefrom to rotate the pin, and torsion means rotatively biasing said pin to position said shoulder into overlapping engagement with said projecting projection on said spring.

13. In an automotive vehicle having a body member and a swingable closure member mounted to close against the body member, a latch structure comprising, a latch pin axially fixedly and rotatably mounted on one of said members to project into the other of said members in the closed position of the closure, an outwardly tapered head on said pin having a keeper engaging shoulder on one side at its inner end projecting beyond the side of the pin, said head and shoulder being cut away along a side of the pin angularly displaced from the shoulder, a support secured to the other of said members with a first wall positioned in spaced side-by-side relation to said pin in the closed position of the members, a second wall on said support arranged at an angle to said first wall, openings formed in said walls, a leaf spring having one end abutted against said first wall with an integral off-set bow projecting through the opening in said one wall into the path of said head as the closure closes on said body member to engage behind said shoulder in the closed position of the closure, the other end of said spring being curved springably from said first end and having a hooked engagement with the edge of the opening in said second wall, an operating arm secured to said pin and projecting therefrom to rotate the pin, and torsion means rotatively biasing said pin to position said shoulder into overlapping engagement with said projecting off-set bow on said spring.

14. In an automotive vehicle having a body member and a swingable closure member mounted to close against the body member, a latch structure comprising, a latch pin axially fixedly and rotatably mounted on one of said members to project into the other of said members in the closed position of the closure, a head on said pin having a keeper engaging shoulder on one side projecting beyond the side of the pin, said head and shoulder being cut away along a side of the pin angularly displaced from the shoulder, a support secured to the other of said members with a first wall positioned in spaced side-by-side relation to said pin in the closed position of the members, a second wall on said support arranged at an angle to said first wall, openings formed in said walls, a leaf spring having one end abutted against said first wall with an off-set projecting through the opening in said one wall into the path of said head as the closure closes on said body member to engage behind said shoulder in the closed position of the closure,
the other end of said spring being curved springably from said first end and having a hooked engagement with the edge of the opening in said second wall,
and an operating arm secured to said pin and projecting therefrom to rotate the pin.

References Cited in the file of this patent
UNITED STATES PATENTS

| | | |
|---|---|---|
| 1,462,727 | Williams | July 24, 1923 |
| 1,472,242 | Covi | Oct. 30, 1923 |
| 1,654,361 | Cameron | Dec. 27, 1927 |
| 2,333,465 | Claud-Mantle | Nov. 2, 1943 |
| 2,486,003 | Christensen | Oct. 25, 1949 |
| 2,896,988 | Hitzelberger | July 28, 1959 |

FOREIGN PATENTS

| | | |
|---|---|---|
| 187,646 | Austria | Jan. 15, 1956 |
| 1,181,268 | France | Jan. 5, 1959 |